UNITED STATES PATENT OFFICE.

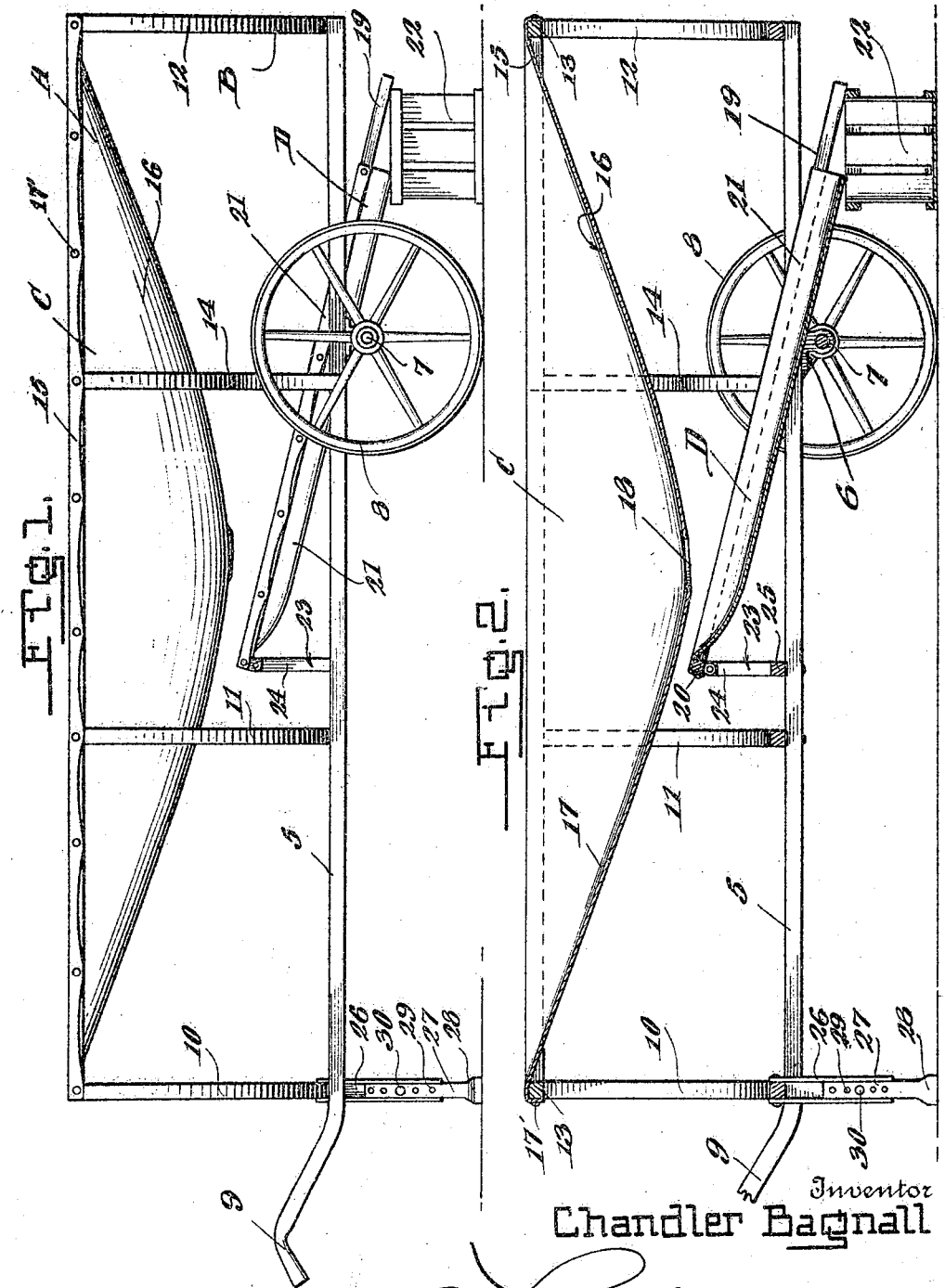

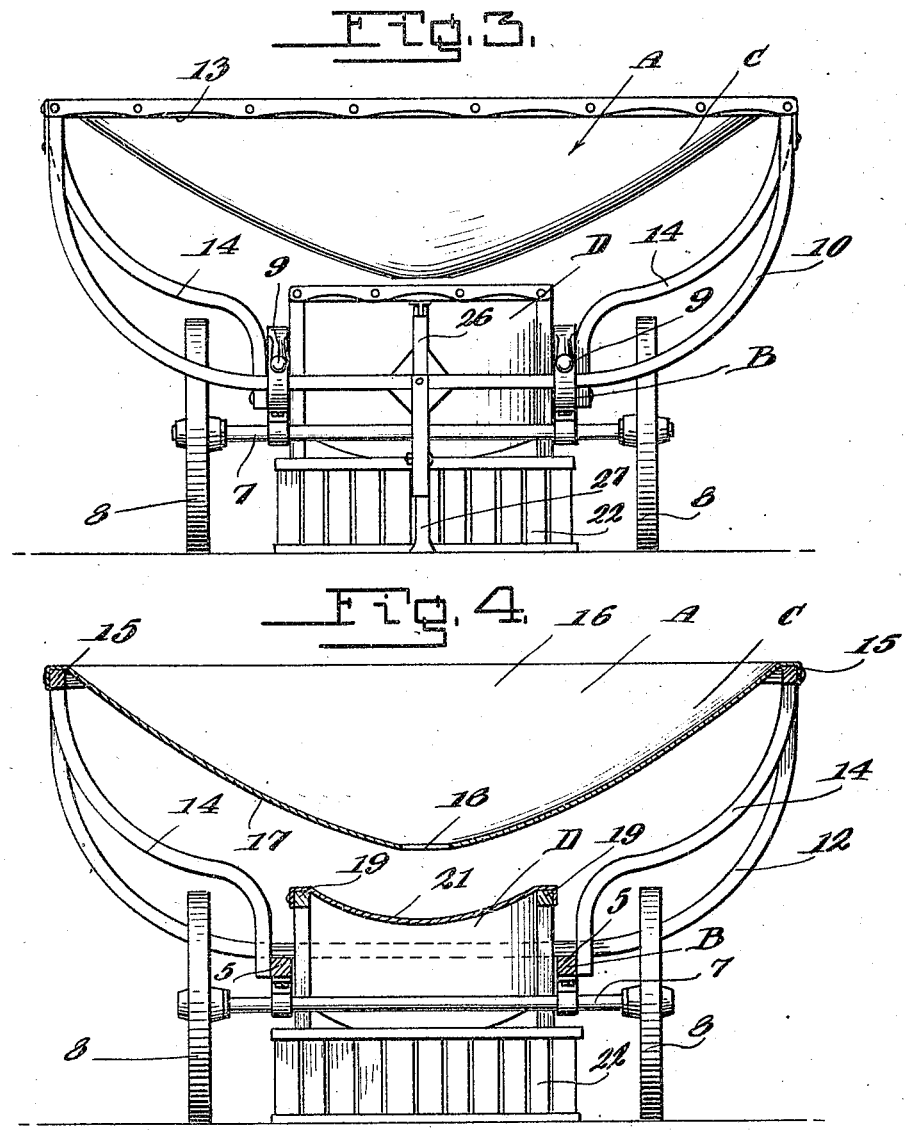

CHANDLER BAGNALL, OF BATTLE CREEK, MICHIGAN.

FRUIT RECEIVING AND CONVEYING DEVICE.

1,380,033. Specification of Letters Patent. Patented May 31, 1921.

Application filed April 5, 1920. Serial No. 371,511.

*To all whom it may concern:*

Be it known that I, CHANDLER BAGNALL, a citizen of the United States, residing at Battle Creek, in the county of Calhoun and State of Michigan, have invented certain new and useful Improvements in Fruit Receiving and Conveying Devices, of which the following is a specification.

This invention relates to means for receiving and conveying fruit to the shipping crates, and the primary object of the invention is to provide an improved device which is adapted to be placed under or in close proximity to a tree from which the fruit thereof is being picked, the device being adapted to receive the fruit from a tree when the same is being picked for conveying the same directly to the shipping crates or baskets.

Another object of the invention is to provide an improved device for permitting the convenient picking of fruit from the fruit bearing tree and for conveying the same to suitable receptacles, which entirely eliminates the laborious method now in vogue of providing containers for each fruit picker which necessitates the carrying of the container or receptacle up into the tree while the fruit is being picked.

A further object of the invention is the provision of an improved means for facilitating the picking of fruit and the packing thereof, which prevents the fruit from becoming bruised during the picking operation and is so constructed that the inclination of the conveyer for storing the fruit in the shipping crate can be adjusted, thereby regulating the speed of travel of the fruit down the conveyer.

A further object of the invention is to provide an improved fruit picking and packing device which includes a relatively large frame having a flexible supporting member arranged to receive the fruit from the trees, the supporting member having an outlet opening formed therein directly above an inclined conveyer under which a shipping crate or the like is adapted to be placed.

A further object of the invention is to provide an improved means for adjusting the inclination of the conveyer and the height of the conveyer from the ground so that various sized crates can be accommodated.

A still further object of the invention is to provide an improved wheeled fruit picking and packing device of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved fruit picking and packing device.

Fig. 2 is a central vertical longitudinal section through the same.

Fig. 3 is an end elevation of the device, and,

Fig. 4 is a vertical transverse section through the device.

Referring to the drawings, in detail, wherein similar reference characters designate corresponding parts throughout the several views, the letter A generally indicates the improved fruit picking and packing device which includes the supporting frame B, the upper fruit receiving member C, and the lower fruit conveying or packing member D.

The frame B includes a pair of spaced longitudinally extending side bars 5, having secured thereto adjacent to the forward ends the depending bearings or boxes 6, which rotatably support any preferred type of vehicle axle 7 on which are mounted the supporting wheels 8. The rear terminals of the side bars 5 are upturned to provide handles or the like 9, by means of which the frame may be readily wheeled over the ground to the desired place where the fruit is to be picked. The side bars 5 have secured to their upper surface the spaced semicircular bows 10, 11, and 12 and the end bows 10 and 12 have secured thereto the transverse bars 13. Arranged between the intermediate bow 11 and the end bow 12 is a pair of oppositely disposed upwardly and outwardly extending arcuate brace bars 14, which are secured to the opposite side faces of the longitudinally extending beams 5. The upper terminals of the brackets or braces 14 terminate in direct alinement to the upper faces of the semi-circular bows 10, 11 and 12, and the bows 10, 11 and 12 and the arcuate brackets or braces 14 support the upper longitudinally extending side bars 15. The longitudinally extending side bars 15 and the transverse end bars 13 form a substantially oblong frame, which is adapted to support the upper fruit receiving member C which will be now described.

The fruit receiving member C includes a flexible body 16 preferably formed of a heavy fabric such as canvas or the like, and this flexible body has its edges folded around the transverse and longitudinally extending bars 13 and 15 as clearly shown in Figs. 2 and 4 of the drawings. The folded edges of the flexible body 16 are secured in place against accidental movement by means of any suitable or preferred type of fastening element 17'. The flexible body 16 is formed relatively large so as to permit the same to sag in the center between the longitudinally extending side bars 15 and the end bars 13 and this forms flexible inclined walls 17 for the receiving member C. The flexible body 16 at substantially the central part thereof is provided with an outlet opening 18 through which the fruit picked is adapted to roll onto the lower conveyer D.

The lower conveyer D is formed relatively small in relation to the frame B and includes a pair of longitudinally extending side bars 19, which are arranged at an angle to the horizontal so as to guide the fruit picked toward one end thereof. The longitudinally extending side bars 19 are carried by the frame B intermediate the side bars 5 thereof, and the inner ends of the side bars 19 have secured thereto a transverse end bar 20. A flexible body preferably formed of canvas or like is secured to the side bars 19 and the end bar 20 and the body is depressed between the bars so that the fruit will be guided toward the longitudinal center thereof. Inasmuch as the flexible body 21 is not stretched tight across the longitudinally extending side bars 19, the body will give as the fruit strikes the upper surface thereof and thus prevent the bruising of the fruit. The outer edge of the flexible body 21 is left free as shown and terminates short of the outer ends of the beams 19. In use of the improved device any preferred type of basket or shipping crate 22 is adapted to be placed directly under the free end of the flexible conveyer body 21 so as to receive the fruit as the same drops from the conveyer. The outer ends of the bars 19 are also adapted to rest upon the upper surface of the crate or basket so as to facilitate the correct positioning of the crate or basket under the conveyer. The inner end of the longitudinally extending side bars 19 carry the depending supporting brackets 23, which include the upstanding side bars 24 and the transverse horizontally disposed cross bar 25, which is adapted to engage the upper surface of the longitudinally extending side bars 5. This forms the means for holding the lower conveyer D in correct position.

The rear semi-circular member 10 has secured thereto at its central portion, the depending guide 26, which has adjustably mounted therein the sliding leg 27 which is provided with a foot 28 adapted to engage the surface of the ground. The leg 27 is provided with a plurality of equi-distantly spaced openings 29, any one of which is adapted to register with an opening formed in the guide 26, and the registering openings are adapted to receive a bolt 30 which holds the leg in adjusted position. It can be seen that by raising or lowering the leg 27 the inclination of the conveyer 21 can be regulated, thereby controlling the speed of travel of the fruit down the conveyer toward the basket or shipping crate 22.

In operation of the improved fruit picking and packing device, the handles 9 are grasped by the operator and the device is wheeled under or between the trees from which the fruit is to be picked. The pickers then climb up the trees in the usual manner and throw the fruit on the flexible receiving member 16. This prevents the bruising of the fruit and eliminates the necessity of the pickers carrying receptacles when they climb the trees. As the fruit strikes the flexible body 16, the same will roll down inclined sides 17 thereof toward the opening 18 and through the same onto the conveyer D and the same will be guided to the crate or basket 22. As soon as the crate or basket 22 has been filled with the fruit the same is removed and a new basket placed beneath the conveyer. This permits of the fruit being packed directly in the field. After the fruit trees have been stripped, the device is again moved under or between other trees which are to be picked.

From the foregoing description it can be seen that an improved fruit picking and packing device is provided which is exceptionally simple and durable in construction and which will entirely eliminate the laborious method now pursued in fruit picking and packing.

Changes in details may be made without departing from the spirit or scope of the invention; but,

I claim:

1. A fruit picking and packing device comprising a frame, supporting wheels arranged in one end of the frame, an adjustable supporting leg carried by the opposite end of the frame, a plurality of equi-distantly spaced bows carried by the frame, a superposed supporting frame carried by the bows, a flexible fruit receiving member having inclined sides carried by the superposed frame, the flexible body having a centrally positioned opening therein, an inclined frame carried by the first mentioned frame arranged at an angle thereto, and a flexible body carried by the inclined frame.

2. In a fruit picking and packing device, a lower substantially rectangular frame, a pair of supporting wheels carried by one end of the frame, an adjustable leg carried by the opposite end of the frame, a plurality of equi-distantly spaced bows carried by the upper surface of the frame, a substantially rectangular superposed frame carried by the terminals of the bows, a flexible fruit receiving member carried by the bows having inclined sides, the fruit receiving member having a centrally disposed opening therein, a pair of spaced longitudinally extending bars carried by the lower frame and arranged at an angle thereto, and a flexible body secured to the bars and terminating short of one end thereof.

3. A fruit receiving and conveying device comprising an elongated relatively narrow wheeled frame, a supporting frame carried by the wheeled frame and arranged to extend beyond the longitudinal edges thereof, a flexible receiving member carried by the supporting frame having an outlet opening, and an inclined flexible runway carried by the wheeled frame at the longitudinal center thereof and having one terminal thereof arranged below the outlet opening formed in the flexible receiving member.

4. A fruit picking and packing device comprising a main frame, a pair of ground engaging wheels carried by the main frame and arranged forwardly of the transverse center thereof and forming a fulcrum for the same, a flexible receiving member carried by the main frame having an outlet opening therein, an inclined flexible runway carried by the main frame disposed below the outlet opening and extending forwardly of the frame to a point in advance of the ground wheels, a supporting leg carried by the frame arranged in rear of the transverse center thereof, and means for adjusting the supporting leg on the main frame, whereby the forward end of the inclined run way may be adjusted in relation to the ground.

CHANDLER BAGNALL.